United States Patent
Schlipf et al.

(10) Patent No.: US 11,493,395 B2
(45) Date of Patent: Nov. 8, 2022

(54) PRESSURE MEASUREMENT MODULE FOR MEASURING INLET PRESSURE AND OUTLET PRESSURE OF A FLUID APPLICATION SYSTEM

(71) Applicant: Precision Planting LLC, Tremont, IL (US)

(72) Inventors: Ben L. Schlipf, Tremont, IL (US); Brent Wiegand, Mackinaw, IL (US)

(73) Assignee: Precision Planting, LLC, Tremont, IL (US)

( * ) Notice: Subject to any disclaimer, the term of this patent is extended or adjusted under 35 U.S.C. 154(b) by 321 days.

(21) Appl. No.: 16/634,776

(22) PCT Filed: Jul. 25, 2018

(86) PCT No.: PCT/US2018/043760
§ 371 (c)(1),
(2) Date: Jan. 28, 2020

(87) PCT Pub. No.: WO2019/027771
PCT Pub. Date: Feb. 7, 2019

(65) Prior Publication Data
US 2020/0209087 A1    Jul. 2, 2020

Related U.S. Application Data

(60) Provisional application No. 62/539,212, filed on Jul. 31, 2017.

(51) Int. Cl.
*G01L 13/00*    (2006.01)
*G01L 19/00*    (2006.01)
(Continued)

(52) U.S. Cl.
CPC ............... *G01L 9/00* (2013.01); *F04B 49/00* (2013.01); *F04B 51/00* (2013.01); *G01L 13/00* (2013.01);
(Continued)

(58) Field of Classification Search
CPC ... G01L 3/24; G01L 3/242; G01L 5/08; G01L 5/10; G01L 5/101; G01L 5/108;
(Continued)

(56) References Cited

U.S. PATENT DOCUMENTS 4,820,129 A    4/1989    Magnussen, Jr.
6,032,689 A    3/2000    Tsai et al.
(Continued)

FOREIGN PATENT DOCUMENTS

EP    1190924 A2 *    3/2002    ............ B60T 13/665
WO    2016/057493 A1    4/2016

OTHER PUBLICATIONS

Metallux, ME790—Piezoresistive Monolithic with signal conditioning located @ http://metallux.ch/pressuresensor/me790/; published Jun. 19, 2017.
(Continued)

*Primary Examiner* — Andre J Allen

(57) ABSTRACT

A module for measuring and monitoring an inlet and outlet pressure is described herein. The module includes an inlet pressure port for fluid communication to a fluid line before a filter and the inlet pressure port comprising a first pressure sensor. The module includes an outlet pressure port for fluid communication to a fluid line after the filter and the outlet pressure port comprising a second pressure sensor. At least one signal port is disposed in the module. The first pressure sensor and the second pressure sensor during operation are in signal communication with the at least one signal port.

22 Claims, 7 Drawing Sheets

(51) Int. Cl.
*F04B 49/00* (2006.01)
*F04B 51/00* (2006.01)
*G01L 9/00* (2006.01)
*A01C 23/00* (2006.01)
*A01M 7/00* (2006.01)

(52) U.S. Cl.
CPC ............ G01L 19/00 (2013.01); G01L 19/003 (2013.01); *A01C 23/007* (2013.01); *A01M 7/0089* (2013.01)

(58) Field of Classification Search
CPC ......... G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC ..................................................... 73/700–756
See application file for complete search history.

(56) References Cited

U.S. PATENT DOCUMENTS

| | | |
|---|---|---|
| 2002/0038975 A1 | 4/2002 | McCurdy, Jr. et al. |
| 2008/0148807 A1* | 6/2008 | Berry ...................... G01L 9/007 73/1.57 |
| 2011/0255992 A1 | 10/2011 | Tran et al. |
| 2016/0298569 A1* | 10/2016 | Bays ................... F02D 41/3836 |
| 2016/0320257 A1* | 11/2016 | Oakes ..................... G01L 23/24 |
| 2021/0116272 A1* | 4/2021 | Carpenter ........... G01L 19/0007 |
| 2021/0231474 A1* | 7/2021 | Yuuki ..................... G01F 15/00 |

OTHER PUBLICATIONS

USPTO, International Search Report for related International Application No. PCT/US2018/43760, dated Oct. 23, 2018.

* cited by examiner

PRESSURE MEASUREMENT MODULE FOR MEASURING INLET PRESSURE AND OUTLET PRESSURE OF A FLUID APPLICATION SYSTEM

RELATED APPLICATIONS

This application claims the benefit of U.S. Provisional Application No. 62/539,212, filed on Jul. 31, 2017 entitled: PRESSURE MEASUREMENT MODULE, which is incorporated by reference herein.

TECHNICAL FIELD

This application relates to a pressure measurement module.

BACKGROUND

Devices for controlling and monitoring liquid applications are disclosed in WO2017058616, which is incorporated herein by reference in its entirety. These devices can be used to control fluid delivery on agricultural implements, such as fertilizer, fungicide, or insecticide.

BRIEF DESCRIPTION OF THE DRAWINGS

The present disclosure is illustrated by way of example, and not by way of limitation, in the figures of the accompanying drawings and in which.

BRIEF SUMMARY

A module for measuring inlet pressure and outlet pressure and optionally system pump pressure and communicating the pressures to a system for monitoring and/or controlling a pump and flow control modules.

DETAILED DESCRIPTION

Figure 1:
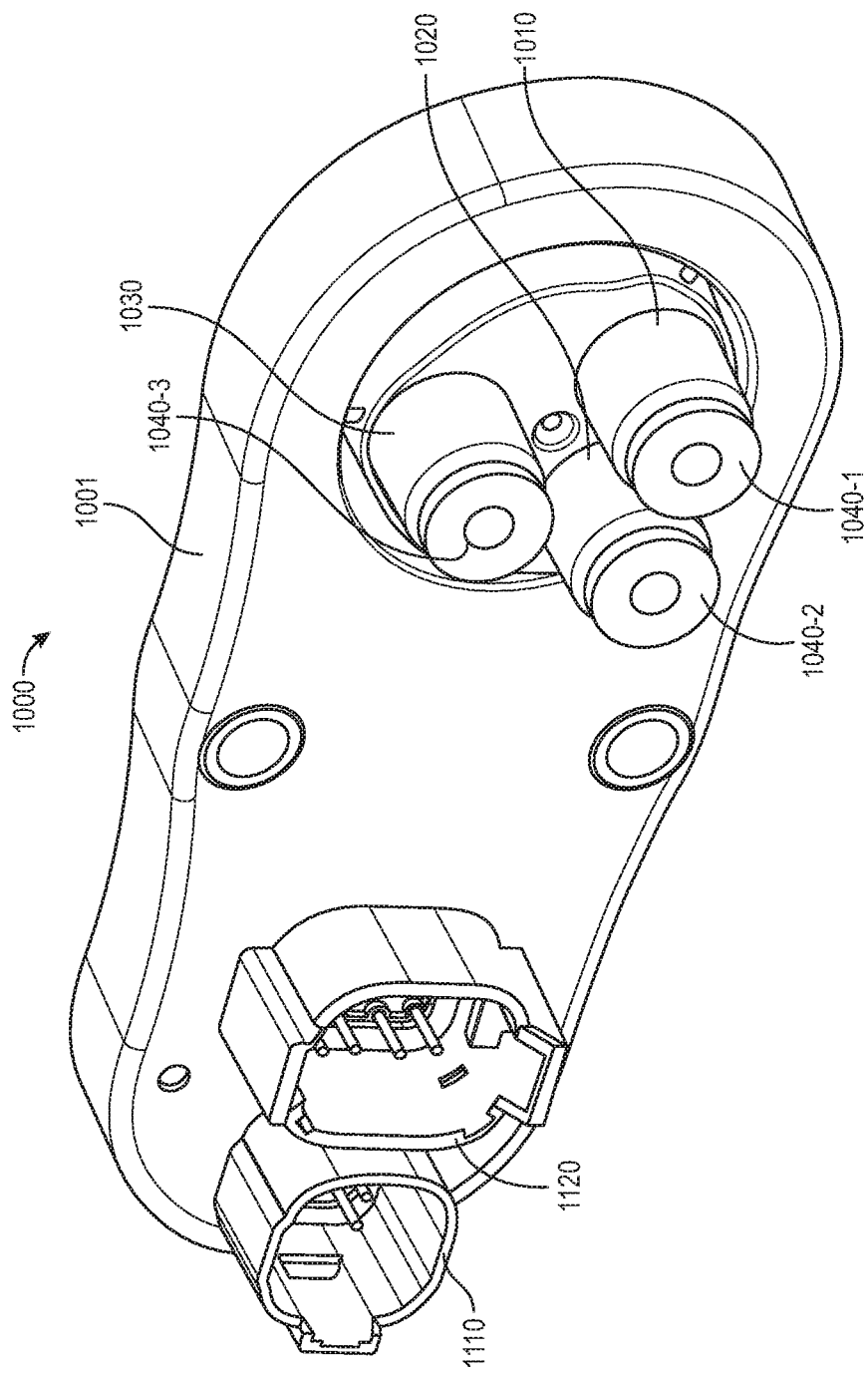
FIG. 1 shows a perspective view of a pressure measurement module in accordance with one embodiment.

A pressure measurement module 1000 is illustrated in FIG. 1 according to one embodiment. The pressure measurement module measures pressure on an inlet side and an outlet side of a filter to provide a pressure differential across the filter. Optionally, pressure measurement module 1000 also measures system pressure generated by a pump. With different systems, filters can be disposed at different locations in a fluid application system, either before or after a pump. Measuring inlet pressure and outlet pressure at the filter provides pressure drop across the filter. Since system pressure could be measured before or after the filter, having pressure measurement before and after the filter simplifies configuration of having to determine if system pressure is measured before or after the filter to then measure pressure on the other side of the filter from system pressure.

Illustrated in FIG. 1, pressure measurement module 1000 has a body 1001. Pressure measurement module 1000 has a first signal port 1110 and a second signal port 1120. First signal port 1110 and second signal port 1120 provide signal communication to system 1200. Pressure measurement module 1000 includes an inlet pressure port 1010, and outlet pressure port 1020, and optionally a system pressure port 1030.

Figure 2:
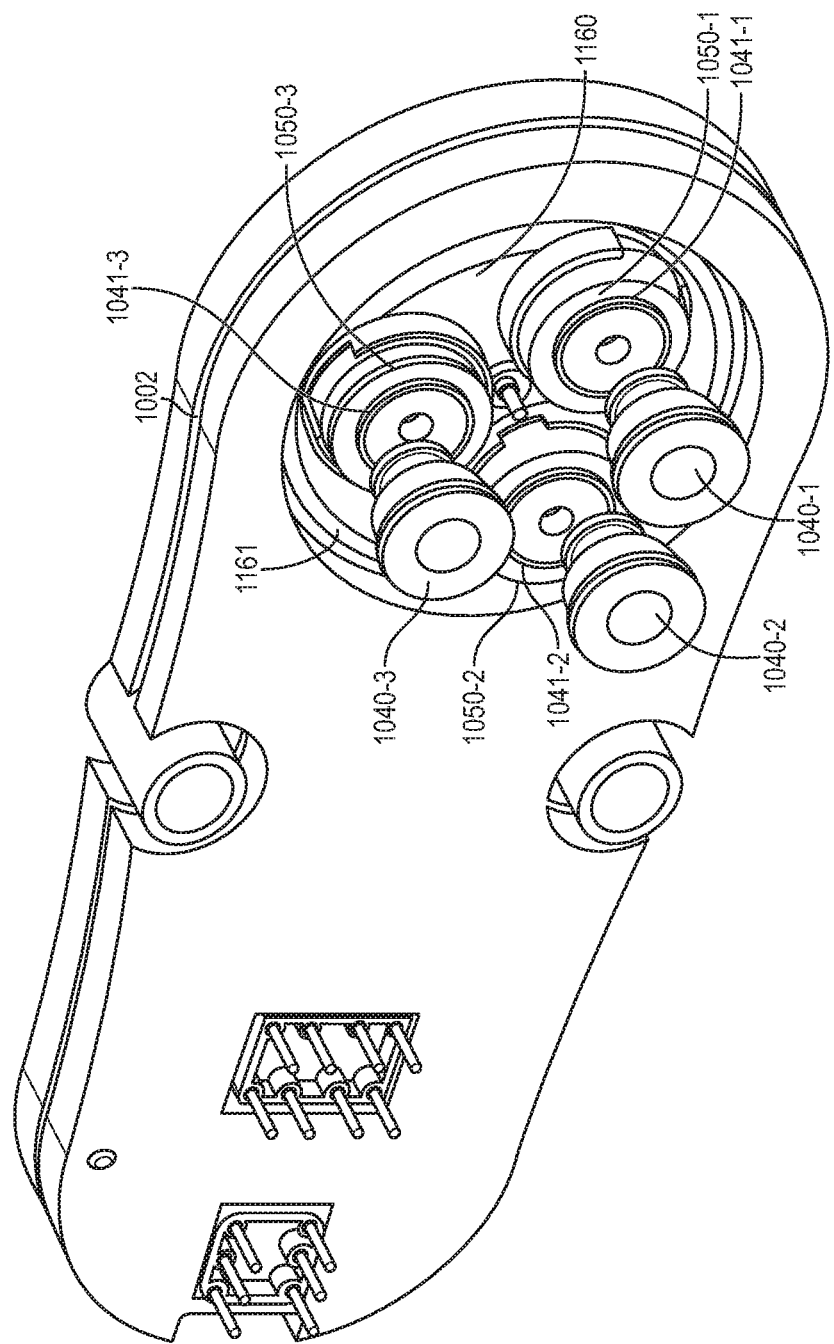
FIG. 2 shows a perspective view of the pressure measurement module of FIG. 1 with the cover removed in accordance with one embodiment.
Figure 3:
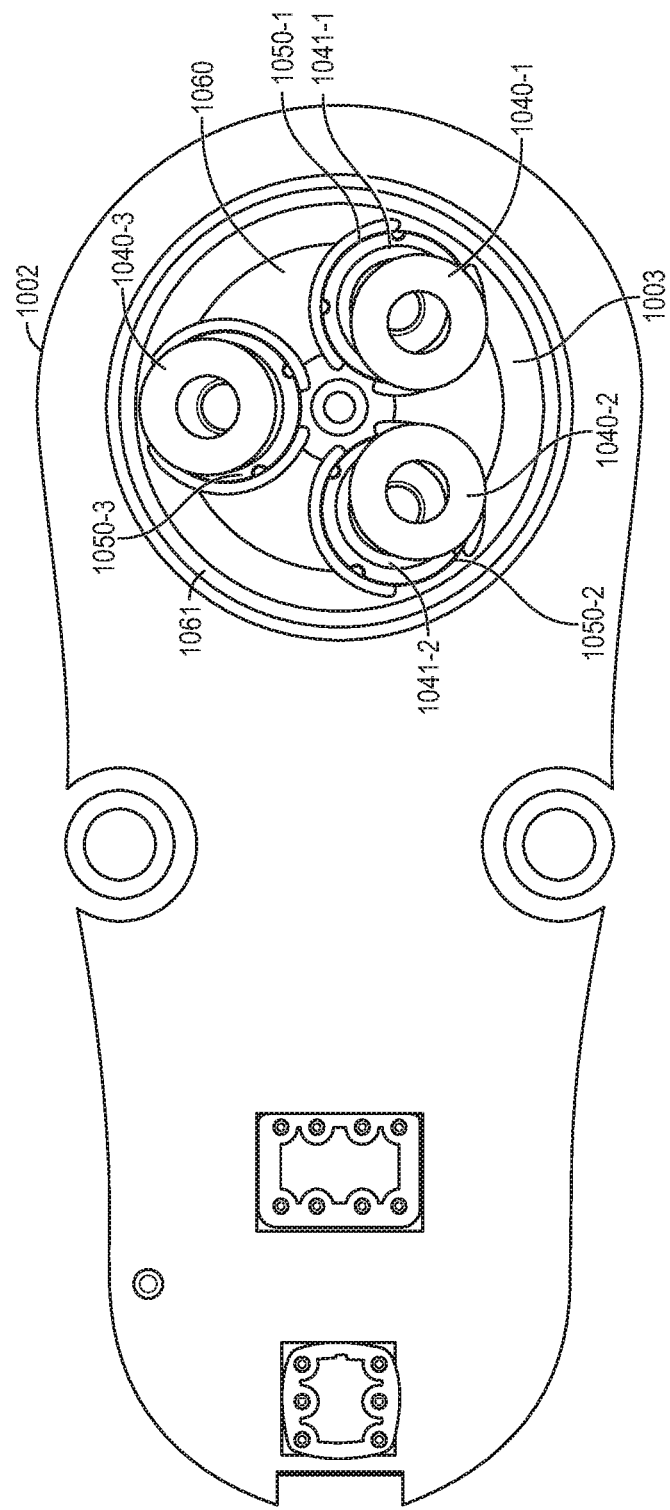
FIG. 3 shows a top plan view of the pressure measurement module of FIG. 2 in accordance with one embodiment.
Figure 4:
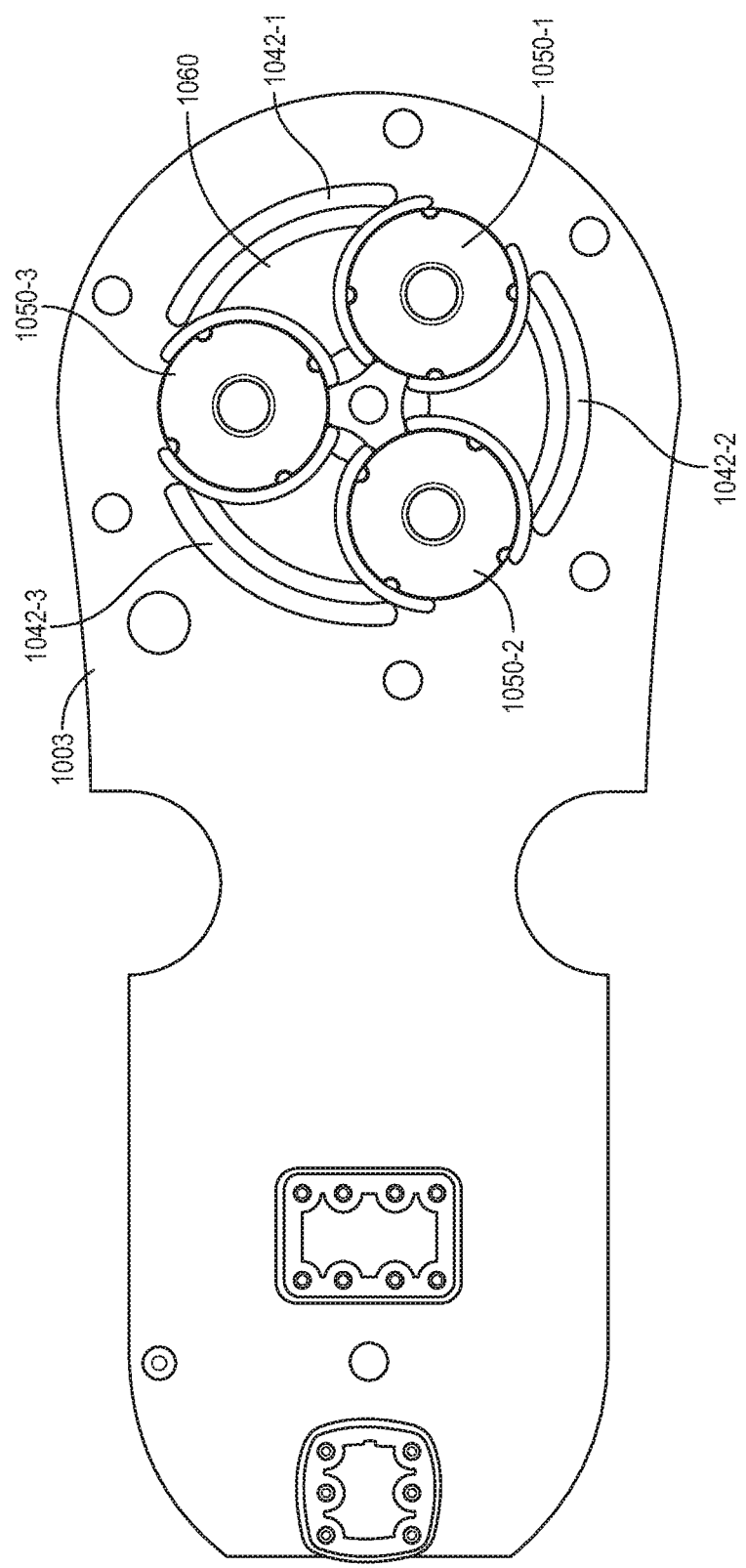
FIG. 4 shows a top plan view of the pressure measurement module of FIG. 3 with parts removed to show the pressure measurement devices in accordance with one embodiment.

Illustrated in FIGS. 2 to 4, each pressure port can be similarly designed. For brevity, inlet pressure port 1010 will be described in detail with its parts designated with -1, outlet pressure port 1020 parts designated with -2, and system pressure port 1030 parts designated with -3. Inlet pressure port can have a connection 1040-1, such as a push to connect connection, for connecting to a line (e.g., fluid line) to inlet pressure port 1040-1. Disposed in inlet pressure port 1010 is pressure sensor 1050-1. A seal 1041-1, such as an o-ring, can be disposed over pressure sensor 1050-1. Each pressure sensor 1050-1, 1050-2, and 1050-3 can be disposed on a base 1060. Pressure measurement module 1000 has an internal body 1002. A base 1003 is part of internal body 1002, and base 1060 can be disposed on base 1003. Optionally, a seal 1161, such as an o-ring, isolates pressure sensors 1050-1, 1050-2, 1050-3 from internal body 1002.

Pressure sensor 1050 can be any type of sensor to measure pressure. In one embodiment, pressure sensor 1050 is a monolithic ceramic pressure sensor, such as the ME790 pressure sensor from Metallux. Each pressure sensor 1050-1, 1050-2, 1050-3 is in signal communication with at least one of the first signal port 1110 and the second signal port 1120. The inlet pressure, the outlet pressure, and system pressure can be displayed on a display, such as 1225 and/or 1230.

Figure 5:
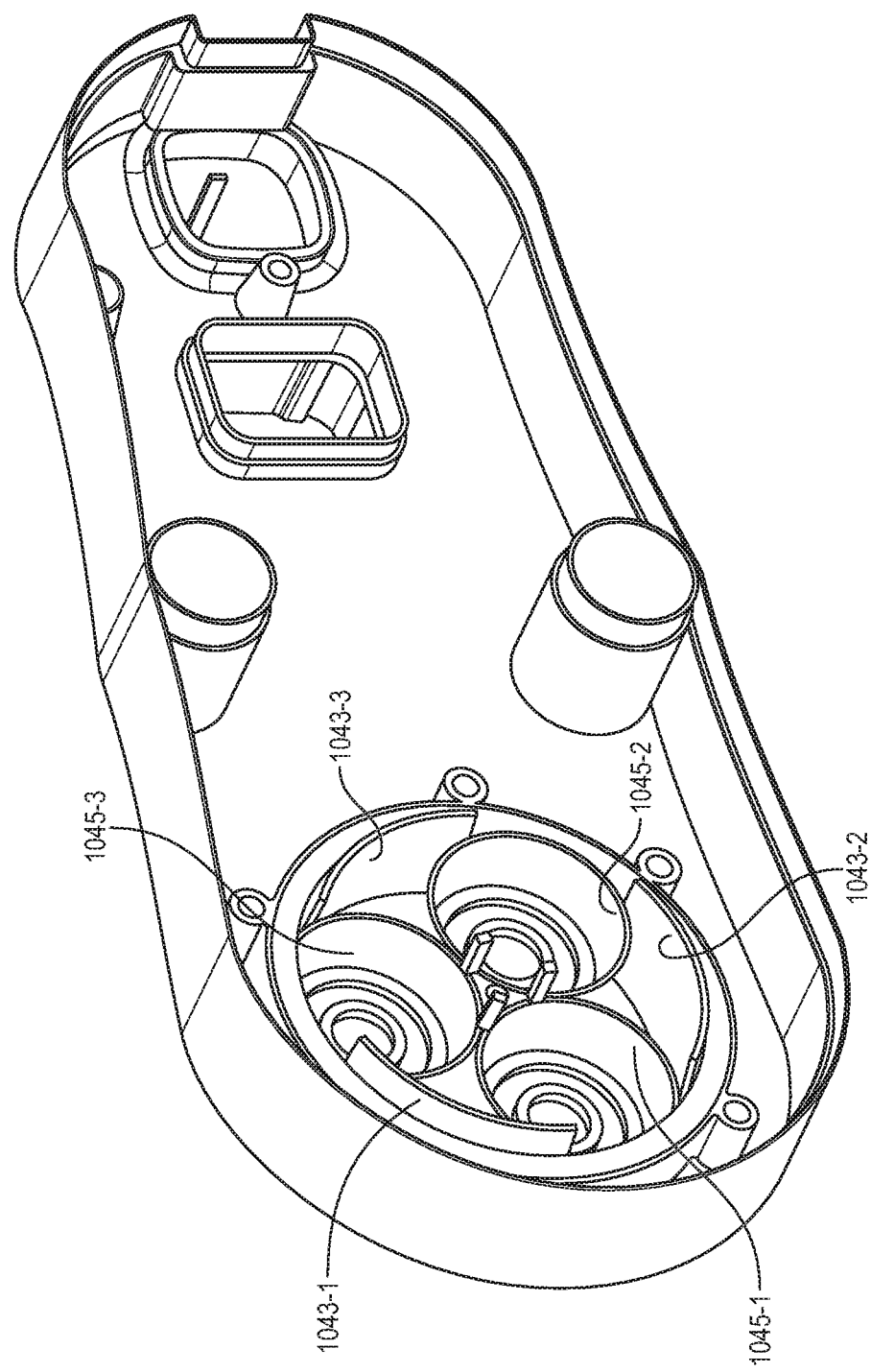
FIG. 5 shows a perspective view of the inside of the body of the pressure measurement module of FIG. 1 in accordance with one embodiment.

FIG. 5 illustrates a perspective view of the inside of body 1001 in accordance with one embodiment. Internal port body 1045 (1045-1, 1045-2, and 1045-3) extends from connection 1040 (1040-1, 1040-2, and 1040-3) to surround pressure sensor 1050 (1050-1, 1050-2, 1050-3). Optionally, mating member 1043 (1043-1, 1043-2, 1043-3) extends from body 1001 to insert into openings 1042 (1042-1, 1042-2, 1042-3) in base 1003. In combination with seal 1061 and seals 1041 internal port body 1045 and mating member 1043 isolates fluid from other components inside pressure measurement module 1000.

Additionally, the pressure measurement module 1000 can include controls for a pump (such as pump 254) and control and monitoring unit 300 based on input from the control and monitoring unit 300 of FIG. 3 of WO2017058616.

Figure 6:
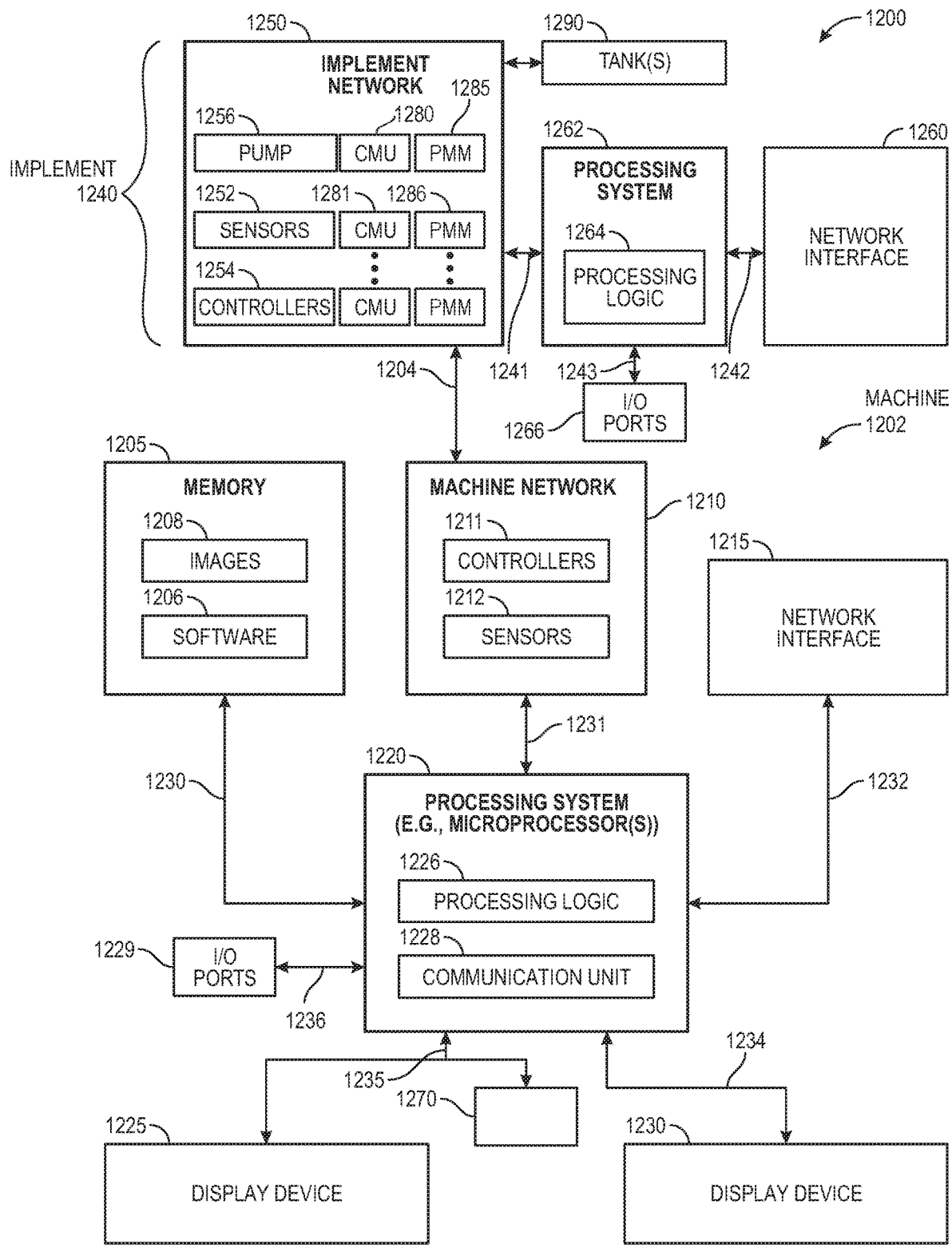
FIG. 6 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment.

FIG. 6 shows an example of a system 1200 that includes a machine 1202 (e.g., tractor, combine harvester, etc.) and an implement 1240 (e.g., planter, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 6. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for liquid or fluid applications of a field. The flow rate of a liquid or fluid application for each row unit of the implement can be associated with locational data at time of application to have a better understanding of the applied liquid or fluid for each row and region of a field. Data associated with the liquid or fluid applications can be displayed on at least one of the display devices 1225 and 1230.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors may process the communications received from the communication unit 1228 including agricultural data (e.g., GPS data, liquid application data, flow rates, etc.). The system 1200 includes memory 1205 for storing data and programs for execution (software 1206) by the processing system. The memory 1205 can store, for example, software components such as liquid or fluid application software for analysis of liquid or fluid applications for performing operations of the present disclosure, or any other software application or module, images (e.g., captured images of crops), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1230-1236, respectively.

Display devices 1225 and 1230 can provide visual user interfaces for a user or operator.

The display devices may include display controllers. In one embodiment, the display device 1225 is a portable tablet device or computing device with a touchscreen that displays data (e.g., liquid or fluid application data, captured images, localized view map layer, high definition field maps of as-applied liquid or fluid application data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied liquid or fluid application data, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation, implement, etc.) includes an implement network 1250, a processing system 1262, a network interface 1260, and optional input/output ports 1266 for communicating with other systems or devices including the machine 1202. The implement network 1250 (e.g, a controller area network (CAN) serial bus protocol network, an ISOBUS network, etc.) includes a pump 1256 for pumping liquid or fluid from a storage tank(s) 1290 to CMUs 1280, 1281, . . . N of the implement, pressure measurement modules (e.g., PMM 1285, PMM 1286, . . . ) for measuring inlet, outlet, and optionally system pressures as described herein, sensors 752 (e.g., speed sensors, seed sensors for detecting passage of seed, downforce sensors, actuator valves, OEM sensors, flow sensors, etc.), controllers 754 (e.g., GPS receiver), and the processing system 762 for controlling and monitoring operations of the machine. Each row unit can include a PMM that is separate from the CMU. Alternatively, the PMM can be integrated with the CMU. The CMUs control and monitor the application of the liquid or fluid to crops or soil as applied by the implement. The liquid or fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process data (e.g., liquid application data, seed sensor data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

In one example, sensors includes ion selective electrodes and IR spectroscopy for measuring different nutrients (e.g., nitrogen, phosphorus, potassium, etc.) of soil samples. A rate of liquid or fluid application can be changed dynamically in-situ in a region of a field during an agricultural operation by the control and monitoring units and flow devices disclosed herein based on a measured amount of soil nutrients (e.g., recently measured soil nutrients, dynamic real time measured amount of different nutrients) in the region of the field that is measured during the agricultural operation or has been previously measured for the particular region of the field. The sensors may also include soil conductivity, soil temperature, and optical sensors.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 6.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure including measuring pressures with the PMMs, providing measured pressure data to a display of the system 1200, and monitoring and/or controlling a pump and flow control modules. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Figure 7:
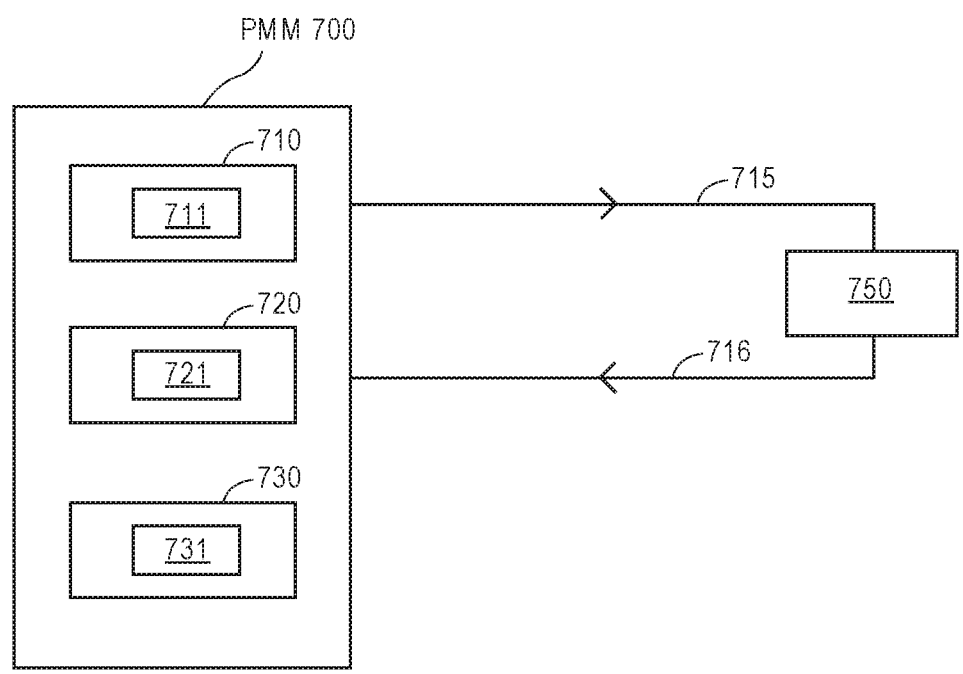
FIG. 7 illustrates a block diagram of a PMM 700 and a filter in accordance with one embodiment.

FIG. 7 illustrates a block diagram of a PMM 700 and a filter in accordance with one embodiment. The PMM 700 includes an inlet pressure port 710 having a pressure sensor 711, an outlet pressure port 720 having a pressure sensor 721, and optionally system pressure port 730 having a pressure sensor 731. The pressure measurement module (PMM) 700 measures pressure on an inlet side with inlet pressure port 710 and an outlet side with outlet pressure port 720 of a filter 750 to provide a pressure differential across the filter 750. A fluid flows through inlet pressure port 710 to a fluid line 715 to the filter 750 to a fluid line 716 to the outlet pressure port 720. Optionally, the PMM 700 also measures system pressure generated by a pump with system pressure port 730.

In another embodiment, pressure measurement module 1000 when installed in a system can be calibrated when the pump (such as pump 254) is not operating to generate pressure in the system. When the pump is off, the first pressure port 1010 and the second pressure port 1020 should measure the same relative pressure. If there is a difference in pressure between the first pressure port 1010 and the second pressure port 1020, then one or both of the first pressure port 1010 and the second pressure port 1020 can be have an offset created so that the pressure of both the first pressure port 1010 and the second pressure port 1020 are the same. The offset can be stored in memory 1205.

What is claimed is:

1. A pressure measurement module for measuring inlet and outlet pressure comprising:
   a body of the pressure measurement module;
   an inlet pressure port disposed in the body for fluid communication to a fluid line before a filter and the inlet pressure port comprising a first pressure sensor;
   an outlet pressure port disposed in the body for fluid communication to a fluid line after the filter and the outlet pressure port comprising a second pressure sensor; and
   at least one signal port disposed in the body of the pressure measurement module and communicatively coupled to a fluid application system, wherein the first pressure sensor and the second pressure sensor during operation are communicatively coupled with the at least one signal port.

2. The pressure measurement module of claim 1, wherein the first pressure sensor and the second pressure sensor are each a monolithic ceramic pressure sensor, wherein the first pressure sensor is disposed in the inlet pressure port, wherein the second pressure sensor is disposed in the outlet pressure port.

3. The pressure measurement module of claim 1, wherein the first pressure sensor to measure a pressure before the filter and the second pressure sensor to measure a pressure after the filter to provide a pressure differential across the filter.

4. The pressure measurement module of claim 1 further comprising a system pressure port for fluid communication to a line in a fluid system and comprising a third pressure sensor.

5. The pressure measurement module of claim 4, wherein the third pressure sensor to measure a pressure from a pump in the fluid system.

6. The pressure measurement module of claim 5, further comprising a control for controlling the pump.

7. The pressure measurement module of claim 4, wherein the third pressure sensor during operation is in signal communication with the at least one signal port.

8. The pressure measurement module of claim 1, further comprising:
a first base with the first and second pressure sensors being disposed on the first base; and
a second base with the first base being disposed on the second base.

9. The pressure measurement module of claim 8, further comprising:
a first seal disposed over the first pressure sensor; and
a second seal disposed over the second pressure sensor.

10. The pressure measurement module of claim 9, further comprising:
an internal body; and
a third seal to isolate the first and second pressure sensors from the internal body.

11. A fluid system for applying fluid comprising:
a pump for pumping fluid from a storage tank of an agricultural implement through at least one fluid line;
a pressure measurement module in fluid communication with the pump, the pressure measurement module comprising,
an inlet pressure port for fluid communication to a fluid line before a filter and the inlet pressure port comprising a first pressure sensor,
an outlet pressure port for fluid communication to a fluid line after the filter and the outlet pressure port comprising a second pressure sensor, and
at least one signal port disposed in the pressure measurement module, wherein the pressure measurement module when installed in the fluid system is calibrated when the pump is not operating to generate pressure in the fluid system.

12. The fluid system of claim 11, wherein the first pressure sensor and the second pressure sensor during operation are in signal communication with the at least one signal port, wherein the first pressure sensor is disposed in the inlet pressure port.

13. The fluid system of claim 11, wherein the first pressure sensor and the second pressure sensor are each a monolithic ceramic pressure sensor.

14. The fluid system of claim 11, wherein the first pressure sensor to measure a pressure before the filter and the second pressure sensor to measure a pressure after the filter to provide a pressure differential across the filter.

15. The fluid system of claim 11 further comprising a system pressure port for fluid communication to a fluid line in the fluid system and comprising a third pressure sensor.

16. The fluid system of claim 15, wherein the third pressure sensor to measure a pressure from the pump in the fluid system.

17. The fluid system of claim 11, further comprising a control and monitoring unit (CMU) for measuring and controlling a rate of fluid flow through the CMU.

18. The fluid system of claim 17, wherein the CMU is integrated with the pressure measuring module.

19. The fluid system of claim 11, wherein the fluid system to determine, when the pump is not operating, whether the inlet pressure port and the outlet pressure port have approximately the same relative pressure and to apply an offset if a difference in pressure exists between the inlet pressure port and the outlet pressure port.

20. A pressure measurement module for measuring inlet and outlet pressure comprising:
a body of the pressure measurement module;
an inlet pressure port disposed in the body and the inlet pressure port comprising a first pressure sensor to measure an inlet pressure of a fluid line;
an outlet pressure port disposed in the body and the outlet pressure port comprising a second pressure sensor to measure an outlet pressure of a fluid line; and
at least one signal port disposed in the body of the pressure measurement module, wherein the first pressure sensor and the second pressure sensor during operation are in signal communication with the at least one signal port to communicate the inlet pressure and the outlet pressure to a system for monitoring and controlling a pump and flow control modules.

21. The pressure measurement module of claim 20, wherein the first pressure sensor and the second pressure sensor are each a monolithic ceramic pressure sensor, wherein the first pressure sensor is disposed in the inlet pressure port, wherein the second pressure sensor is disposed in the outlet pressure port.

22. The pressure measurement module of claim 20, wherein the first pressure sensor to measure a pressure before a filter and the second pressure sensor to measure a pressure after the filter to provide a pressure differential across the filter.

* * * * *